United States Patent
Mahkonen et al.

(10) Patent No.: US 10,460,087 B2
(45) Date of Patent: Oct. 29, 2019

(54) METHOD AND APPARATUS TO SECURE AND PROTECT DATA-CENTERS AND GENERALIZED UTILITY-BASED CLOUD COMPUTING ENVIRONMENTS FROM UNINVITED GUESTS IN THE FORM OF BOTH HARDWARE AND SOFTWARE

(71) Applicant: Telefonaktiebolaget LM Ericsson (publ), Stockholm (SE)

(72) Inventors: Heikki Mahkonen, San Jose, CA (US); Wassim Haddad, San Jose, CA (US); Ravi Manghirmalani, Fremont, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/321,001

(22) PCT Filed: Aug. 18, 2016

(86) PCT No.: PCT/IB2016/054954
§ 371 (c)(1),
(2) Date: Jan. 25, 2019

(87) PCT Pub. No.: WO2018/033776
PCT Pub. Date: Feb. 22, 2018

(65) Prior Publication Data
US 2019/0163886 A1 May 30, 2019

(51) Int. Cl.
*G06F 21/14* (2013.01)
*G06F 9/455* (2018.01)
(Continued)

(52) U.S. Cl.
CPC .......... *G06F 21/14* (2013.01); *G06F 9/45558* (2013.01); *G06F 9/5072* (2013.01);
(Continued)

(58) Field of Classification Search
CPC ....................................................... G06F 21/14
(Continued)

(56) References Cited

U.S. PATENT DOCUMENTS

| 2004/0088347 A1 | 5/2004 | Yeager et al. |
| 2006/0174115 A1* | 8/2006 | Rao ........................ G06F 21/577 713/168 |

(Continued)

FOREIGN PATENT DOCUMENTS

EP 1860817 A1 11/2007

*Primary Examiner* — Jacob Lipman
(74) *Attorney, Agent, or Firm* — Nicholson De Vos Webster & Elliott LLP

(57) ABSTRACT

A method is implemented by a network device communicatively coupled to a datacenter to detect a presence of unauthorized software and hardware in the datacenter. The method includes initiating deployment of a virtual agent on a node in the datacenter, where the virtual agent is to perform a security scan of the node and store results of the security scan in a memory allocated to the virtual agent at the node, and where the results of the security scan are to be encrypted using a data encryption key. The method further includes initiating migration of the virtual agent to a preconfigured location, where the results of the security scan are to be extracted from the virtual agent and decrypted at the preconfigured location.

20 Claims, 4 Drawing Sheets

(51) Int. Cl.
  *G06F 9/50* (2006.01)
  *G06F 21/55* (2013.01)
  *H04L 29/06* (2006.01)
  *H04L 9/08* (2006.01)
  *H04L 12/24* (2006.01)

(52) U.S. Cl.
  CPC ............ *G06F 21/55* (2013.01); *H04L 9/0816* (2013.01); *H04L 41/046* (2013.01); *H04L 63/0428* (2013.01); *H04L 63/145* (2013.01); *H04L 63/1433* (2013.01); *H04L 63/1491* (2013.01); *G06F 2009/4557* (2013.01); *G06F 2009/45587* (2013.01)

(58) Field of Classification Search
  USPC .......................................................... 726/26
  See application file for complete search history.

(56) References Cited

U.S. PATENT DOCUMENTS

| | | |
|---|---|---|
| 2011/0302409 A1 | 12/2011 | Rao et al. |
| 2012/0290850 A1 | 11/2012 | Brandt et al. |
| 2013/0055398 A1* | 2/2013 | Li .................... G06F 21/577 726/25 |
| 2013/0160011 A1* | 6/2013 | Corrie .................. G06F 9/455 718/1 |
| 2015/0381651 A1 | 12/2015 | Lietz et al. |
| 2016/0196449 A1 | 7/2016 | Sikka et al. |

\* cited by examiner

METHOD AND APPARATUS TO SECURE AND PROTECT DATA-CENTERS AND GENERALIZED UTILITY-BASED CLOUD COMPUTING ENVIRONMENTS FROM UNINVITED GUESTS IN THE FORM OF BOTH HARDWARE AND SOFTWARE

CROSS-REFERENCE TO RELATED APPLICATIONS

This application is a national stage of International Application No. PCT/IB2016/054954, filed Aug. 18, 2016, which is hereby incorporated by reference.

TECHNICAL FIELD

Embodiments of the invention relate to the field of network security, and more specifically, to techniques for securing and protecting datacenters.

BACKGROUND

Datacenters are facilities that house computing and/or telecommunications equipment. Datacenters are often used by cloud computing providers to provide physical hardware resources to tenants on demand. Cloud computing provides on-demand access to a shared pool of hardware resources such as computing resources, storage resources, and networking resources. Cloud computing allows users to request additional hardware resources when they are needed, and release hardware resources when they are not needed. Cloud computing has become a highly demanded service due to its capability to offer hardware resources on-demand, relatively cheap costs, scalability, accessibility, and high availability.

Nodes in a datacenter can be compromised by various forms of unwanted software such as root-kits, droppers, bots, infectious agents, ransomed-ware, spyware, espionage-ware, malware, viruses, and worms. Also, backdoor entries to datacenters can be granted by plugging in unauthorized hardware devices to nodes in a datacenter. Such unwanted software and hardware in datacenters can impair and disrupt cloud computing services. As such, it is important for datacenter operators and/or cloud providers to be able to detect the presence of unauthorized software and/or hardware in the datacenter in a secure, efficient, scalable, proactive, and automated manner.

SUMMARY

A method is implemented by a network device communicatively coupled to a datacenter to detect a presence of unauthorized software and hardware in the datacenter. The method includes initiating deployment of a virtual agent on a node in the datacenter, where the virtual agent is to perform a security scan of the node and store results of the security scan in a memory allocated to the virtual agent at the node, and where the results of the security scan are to be encrypted using a data encryption key. The method further includes initiating migration of the virtual agent to a preconfigured location, where the results of the security scan are to be extracted from the virtual agent and decrypted at the preconfigured location.

A network device is configured to detect a presence of unauthorized software and hardware in a datacenter. The network device includes a set of one or more processors and a non-transitory machine-readable storage medium having stored therein a cloud orchestration component. The cloud orchestration component, when executed by the set of one or more processors, causes the network device to initiate deployment of a virtual agent on a node in the datacenter, where the virtual agent is to perform a security scan of the node and store results of the security scan in a memory allocated to the virtual agent at the node, and where the results of the security scan are to be encrypted using a data encryption key. The cloud orchestration component, when executed by the set of one or more processors, further causes the network device to initiate migration of the virtual agent to a preconfigured location, where the results of the security scan are to be extracted from the virtual agent and decrypted at the preconfigured location.

A non-transitory machine-readable medium has computer code stored therein, which when executed by a set of one or more processors of a network device communicatively coupled to a datacenter, causes the network device to perform operations for detecting a presence of unauthorized software and hardware in the datacenter. The operations include initiating deployment of a virtual agent on a node in the datacenter, where the virtual agent is to perform a security scan of the node and store results of the security scan in a memory allocated to the virtual agent at the node, and where the results of the security scan are to be encrypted using a data encryption key. The operations further include initiating migration of the virtual agent to a preconfigured location, where the results of the security scan are to be extracted from the virtual agent and decrypted at the preconfigured location.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
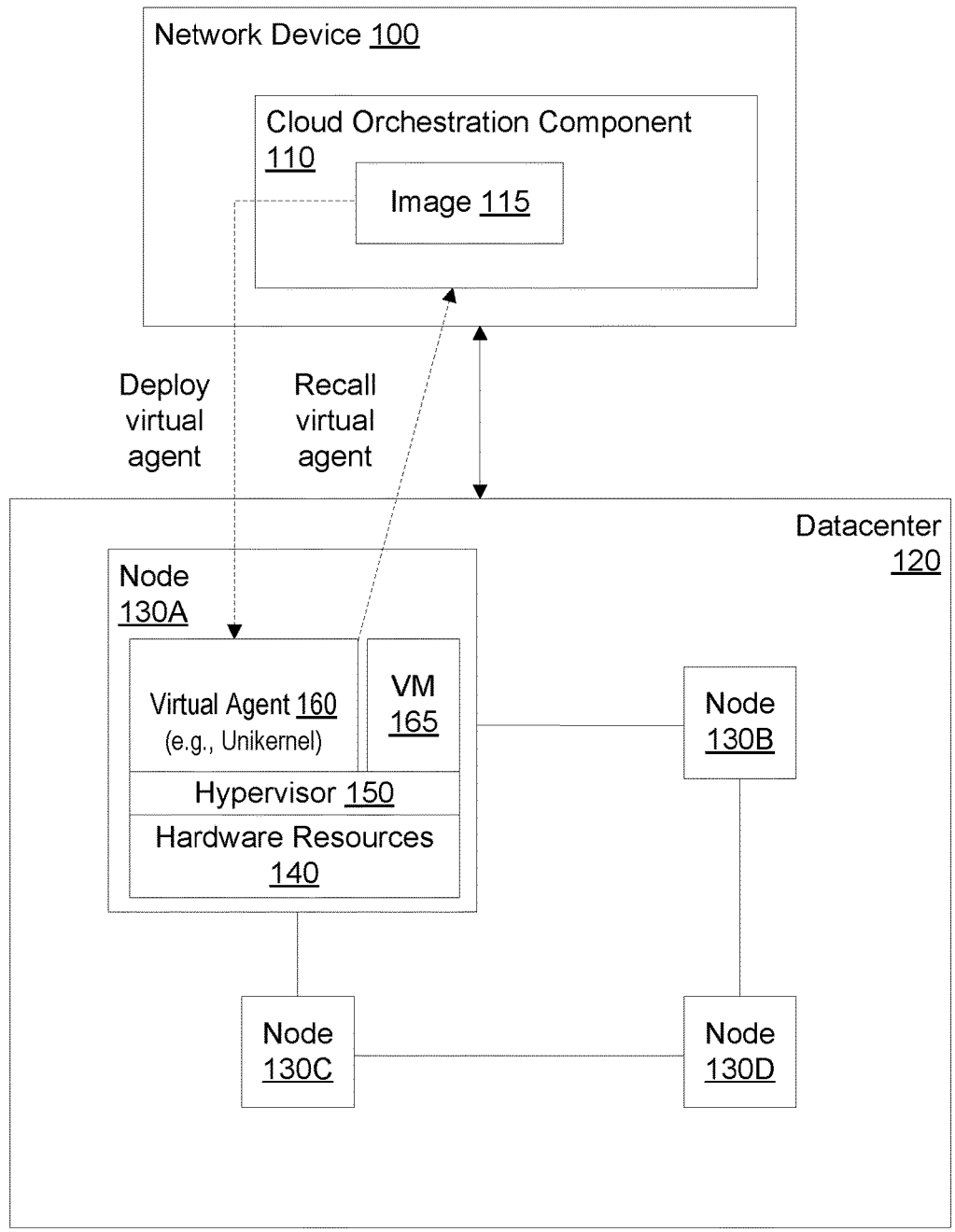
FIG. 1 is a block diagram of a datacenter in which a virtual agent can be deployed, according to some embodiments.

The following description describes techniques for detecting the presence of unauthorized software and hardware in a datacenter. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of the embodiments described herein may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Cloud computing provides on-demand access to a shared pool of hardware resources such as computing resources, storage resources, and networking resources. Cloud computing allows users to request additional hardware resources when they are needed, and release hardware resources when they are not needed. Cloud computing has become a highly demanded service due to its capability to offer hardware resources on-demand, relatively cheap costs, scalability, accessibility, and high availability.

Nodes in a datacenter can be compromised by various forms of unwanted software such as root-kits, droppers, bots, infectious agents, ransomed-ware, spyware, espionage-ware, malware, viruses, and worms. Also, backdoor entries to datacenters can be granted by plugging in unauthorized hardware devices to nodes in a datacenter. Such unwanted software and hardware in datacenters can impair and disrupt cloud computing services. As such, it is important for datacenter operators and/or cloud operators to be able to detect the presence of unauthorized software and/or hardware in the datacenter in a secure, efficient, scalable, proactive, and automated manner.

Embodiments described herein provide a secure, efficient, scalable, proactive, and automated technique to detect the presence of unauthorized software and hardware in a datacenter. This is achieved through the deployment of one or more virtual agents in the datacenter. A virtual agent is a specialized virtual appliance (e.g., unikernel) that is configured to perform a security scan of the node on which it is deployed. According to some embodiments, a network device managing the datacenter may initiate deployment of a virtual agent on a node in the datacenter. Once deployed, the virtual agent may perform a security scan of the node and store results of the security scan in a memory allocated to the virtual agent at the node. The security scan may scan for the presence of unauthorized software on the node, unauthorized hardware on the node, and/or unauthorized configuration changes at the node. Several safety measures may be taken to ensure that the virtual agent itself and/or the results of the security scan are not tampered with. For example, the virtual agent may encrypt the results of the security scan using a data encryption key. Subsequently, the network device may initiate migration of the virtual agent to a preconfigured location (e.g., a location that is trusted (e.g., by the cloud operator) and known to be secure. The results of the security scan can then be extracted from the virtual agent and decrypted at the preconfigured location. The network device may then initiate corrective action in the datacenter based on the results of the security scan. Other embodiments are further described herein with reference to the accompanying diagrams.

FIG. 1 is a block diagram of a datacenter in which a virtual agent can be deployed, according to some embodiments. As shown, the datacenter 120 includes nodes 130A-D. Each node 130 may be an electronic device or network device that includes hardware resources such as computing hardware (e.g., processors), storage hardware (e.g., Random Access Memory (RAM) and hard disks), and networking hardware (e.g., a network interface card (NIC)). Each of the nodes 130 may be communicatively coupled to one or more of the other nodes 130 in the datacenter 120. A cloud operator may offer the various hardware resources in the datacenter 120 to tenants by slicing physical hardware resources 140 into virtualized tenant resources. Tenants can subscribe to the cloud services to obtain a required amount of virtualized computing, storage, and network resources to support their needs.

As shown in the diagram, node 130A includes hardware resources 140. Node 130A executes a hypervisor (also known as a Virtual Machine Monitor (VMM)) that allows Virtual Machines (VMs) (e.g., VM 165 or other virtual appliances (e.g., unikernel)) executing on node 130A to share the hardware resources of node 130A. Each VM 165 running on hypervisor 150 may execute its own operating system (OS) (e.g., a guest OS) and one or more applications. The OS and the applications may not know that they are running on a VM 165 as opposed to running on a "bare metal" host device. Each of the other nodes 130B-D may have a similar configuration as node 130A, and are not described in detail to for the sake of conciseness. For sake of illustration, the datacenter 120 is shown as including four nodes 130. However, it should be understood that the datacenter 120 can include a different number of nodes 130 than shown in the diagram.

Network device 100 is communicatively coupled to the datacenter 120 and is responsible for managing the resources of the datacenter 120. In one embodiment, network device 100 includes a cloud orchestration component 110. In one embodiment, the cloud orchestration component 110 includes cloud management software such as OpenStack or Apcera or similar cloud management software. In one embodiment, the cloud orchestration component 110 is responsible for managing the lifecycle of VMs 165 and other virtual appliances in the datacenter 120. For example, network device 100 may initiate deployment of new VMs 165 in the datacenter 120, initiate migration of VMs 165 within the datacenter 120, and initiate the decommissioning of existing VMs 165 in the datacenter 120.

In one embodiment, the cloud orchestration component 110 is also responsible for managing the security of the datacenter 120. For this purpose, in one embodiment, the cloud orchestration component 110 may initiate deployment of a virtual agent 160 on a node 130 in the datacenter to perform a security scan of the node 130. For example, as shown in the diagram, the cloud orchestration component 110 may initiate deployment of virtual agent 160 on node 130A. The cloud orchestration component 110 may initiate deployment of virtual agent 160 on node 130A by providing an image of virtual agent 160 to node 130A (e.g., by transmitting the image to node 130A or transmitting an indication of the location of the image to node 130A) and instructing node 130A to execute the image. A virtual agent 160 as used herein is a specialized virtual appliance that is configured to perform a security scan of the node 130 on which it is deployed. For example, a virtual agent 160 may scan a node 130 for the presence of unauthorized software, unauthorized hardware, or unauthorized configuration changes at the node 130. Examples of unauthorized software may include rootkits in Graphics Processing Unit (GPU), a compromised hypervisor, and modified drivers in Kernel-based Virtual Machine (KVM). Examples of unauthorized hardware may include unknown devices attached to a Peripheral Component Interconnect (PCI) bus, unknown devices attached to a network, extra links on switches, extra disks, and external Solid State Drives (SSDs). Examples of unauthorized configuration changes may include changes in Bluetooth configuration, Wi-Fi settings, and unaccountable system reboots.

In one embodiment, the virtual agent 160 is implemented as a unikernel. A unikernel is specialized virtual appliance that that can execute natively on a hypervisor 150 without the need for a full-blown OS (e.g., Linux). A unikernel typically includes an application and a bare-minimum set of libraries that are needed to support that application. This is in contrast to a traditional VM that typically includes a full-blown guest OS, many of the features of which are not used by the application. Since unikernels typically have less code than traditional VMs, they have a smaller attack surface, which provides improved security properties. Further unikernels typically have reduced memory footprint and lower boot times compared to traditional VMs. Unikernels are well-suited to perform security scans in a datacenter environment because they have a relatively small attack surface, have a reduced memory footprint, and are protected by the secure privileges of the ring architecture of modern processors. It should be understood, however, that the virtual agent 160 may be implemented using other types of virtualization techniques (e.g., as a VM 165) or even as a bare-metal deployment (e.g., using parallel stacks on the side, utilizing modified agents, or plain hot-inserting of scan code).

In one embodiment, the virtual agent 160 includes a data encryption key. The virtual agent 160 may use the data encryption key to encrypt the results of the security scan. In one embodiment, the data encryption key is supplied by the cloud orchestration component 110. This way, the results of the security scan can only be deciphered by the cloud orchestration component 110 or other entity that possesses the data encryption key.

In one embodiment, the virtual agent 160 includes a hardware access key. The virtual agent 160 may use the hardware access key to gain access to one or more hardware resources 140 of a node 130. For example, when virtual agent 160 is deployed on node 130A, the hypervisor 150 of node 130A may verify the virtual agent's 160 hardware access key before granting the virtual agent 160 with privileged read-only permission to access one or more hardware resources 140 of node 130A.

In one embodiment, the virtual agent 160 includes an indication of a target execution environment. The target execution environment refers to an environment in which the virtual agent 160 is allowed to execute. For example, virtual agent 160 may include an indication that node 130A is the target execution environment. In this case, the virtual agent 160 is configured such that it only executes on node 130A. Additional guards can be put in place that would cease normal execution of the virtual agent 160 if the virtual agent 160 senses that it is placed inside of a debugger or other abnormal operating environment.

In one embodiment, the cloud orchestration component 110 may generate an image 115 of the virtual agent 160. The image 115 of the virtual agent 160 can be used as a template to initiate deployment of the virtual agent 160 on one or more nodes 130 in the datacenter 120. For example, as shown in the diagram, the cloud orchestration component 110 may generate image 115 and use image 115 as a template to initiate deployment of virtual agent 160 on node 130A. The cloud orchestration component 110 may initiate deployment of a virtual agent on a node by transmitting the image 115 of the virtual agent 160 to the node 130, along with instructions to execute the image 115. In one embodiment, the image 115 of the virtual agent 160 is stored in an image repository or other storage location. In this case, the cloud orchestration component 110 may initiate deployment of the virtual agent 160 on a node 130 by transmitting, to the node 130, an indication of the location of the image 115, along with instructions to execute that image 115.

In one embodiment, the image 115 of the virtual agent 160 is obfuscated in order to reduce the possibility of reverse-engineering the virtual agent 160. This may help prevent unauthorized entities from tampering with the virtual agent 160. Various techniques can be used to obfuscate the image 115 of the virtual agent 160 such as employing a multi-stage encrypted boot-loader, dead-code injection, control flow obfuscation path merging, instruction substitution, symbol shuffling, function in-lining, opaque predicate insertion, and randomized code layout. In one embodiment, a data encryption key and/or a hardware access key is embedded in the image 115 of the virtual agent 160, and these can be obfuscated as well.

Once deployed on a node 130, the virtual agent 160 may perform a security scan of the node 130. For example, as shown in the diagram, once virtual agent 160 is deployed on node 130A, it may perform a security scan of node 130A. In one embodiment, the virtual agent 160 scans the node 130 for the presence of unauthorized hardware. In one embodiment, the virtual agent 160 includes the necessary device drivers to perform a bus or device scan (e.g., PCI pass-through). The virtual agent 160 may employ hardware bus scans or bus snooping techniques to detect the presence of unauthorized hardware. Read-access to some devices (e.g., Serial Advanced Technology Attachment (SATA) hard disks) are generally given to supervisor mode administrative level, which can be used by the virtual agent 160 if performance is not a major issue, as para-virtualized code may be called into action. In one embodiment, the virtual agent 160 may lock regions of a device for exclusive read access while performing a security scan in order to avoid malicious code from dodging the security scan. In one embodiment, the virtual agent 160 scans the node 130 for the presence of unauthorized software/firmware. In one embodiment, the regions of software/firmware that the virtual agent 160 scans may include a Basic Input/Output System (BIOS), a Unified Extensible Firmware Interface (UEFI), a System Center Configuration Manager or Systems Management Server (SCCM/SMS), a hypervisor, or any combination thereof. It has been observed that rootkits may hide in various hard to reach "dark corners" of the system such as in GPU memory. The virtual agent 160 may detect whether any of these regions of software/firmware have been tampered with by computing and comparing one-way hashes. In one embodiment, the virtual agent 160 scans the node 130 for unauthorized configuration changes. For example, the virtual agent 160 may detect that Wi-Fi is enabled on a motherboard of a node 130 that is located in a wire-only datacenter and flag this configuration change as being suspicious.

In one embodiment, the virtual agent 160 stores the results of the security scan in its working memory (e.g., RAM). In one embodiment, the results of the security scan are encrypted using a data encryption key. In one embodiment, the virtual agent 160 may hibernate (e.g., temporarily halt execution or otherwise reduce the use of computing resources) in response to detecting that the computational load of the node 130 on which it is deployed exceeds a predetermined threshold load. The state of the virtual agent 160 may be saved in the virtual agent 160 and when the virtual agent 160 wakes up from hibernation, the virtual agent 160 can continue performing the security scan from the point where it last stopped.

After a predetermined time (or after the security scan has completed), the cloud orchestration component 110 may initiate a recall of the virtual agent 160. For example, the cloud orchestration component 110 may initiate migration of the virtual agent 160 (including the results of the security scan) to a preconfigured location that is trusted (e.g., by the cloud operator) and known to be secure. The migration of the virtual agent 160 may entail moving the virtual machine 160 from one physical hardware environment to another physical hardware environment (e.g., from one node 130 to another node 130). The results of the security scan can then be extracted and decrypted at the secure and trusted preconfigured location. The preconfigured location may have the necessary decryption key(s) to decrypt the encrypted security scan results extracted from the virtual agent 160. In one embodiment, the preconfigured location is the location at which the cloud orchestration component 110 resides. For example, as shown in the diagram, the cloud orchestration component 110 may initiate a recall of virtual agent 160 by initiating migration of virtual agent 160 from node 130A to network device 100. Once virtual agent 160 is migrated to network device 100, the results of the security scan can be extracted and decrypted at network device 100.

For sake of simplicity and clarity, the cloud orchestration component 110 is shown as deploying a single virtual agent 160 in the datacenter 120. However, it should be understood that the cloud orchestration component 110 may deploy multiple virtual agents 160 in the datacenter 120, and that these virtual agents 160 can be spread across multiple nodes 130 in the datacenter 120 to perform security scans at multiple nodes 130. Further, the cloud orchestration component 110 may recall multiple virtual agents 160 spread across multiple nodes in the datacenter 120 and collectively analyze the security scan results stored in these virtual agents 160 to obtain a comprehensive view of the security status of the datacenter 120.

Once the results of the security scan are extracted and decrypted, the cloud orchestration component 110 may analyze the results of the security scan and initiate corrective action based on the analysis. Examples of corrective action that can be initiated include migrating a tenant on the node 130 to another node 130 in the datacenter 120, installing a honeypot, decommissioning of the node 130, moving a tenant off the node 130, reinstalling an image on the node 130, deploying another virtual agent 160 in the datacenter 120, or other appropriate action (e.g., notifying the cloud operator of a potential security breach). It should be understood that the cloud orchestration component 110 may initiate other forms of corrective action other than those mentioned above (e.g., depending on the cloud operator's policy). In some cases, the virtual agent 160 may have not completed performing its intended security scan for various reasons (e.g., system load or tampered environment). Depending on the policies of the cloud operator, appropriate action can be initiated.

In this way, the embodiments described herein provide a secure, efficient, scalable, proactive, and automated detection of unauthorized hardware/software in a datacenter 120.

Figure 2:
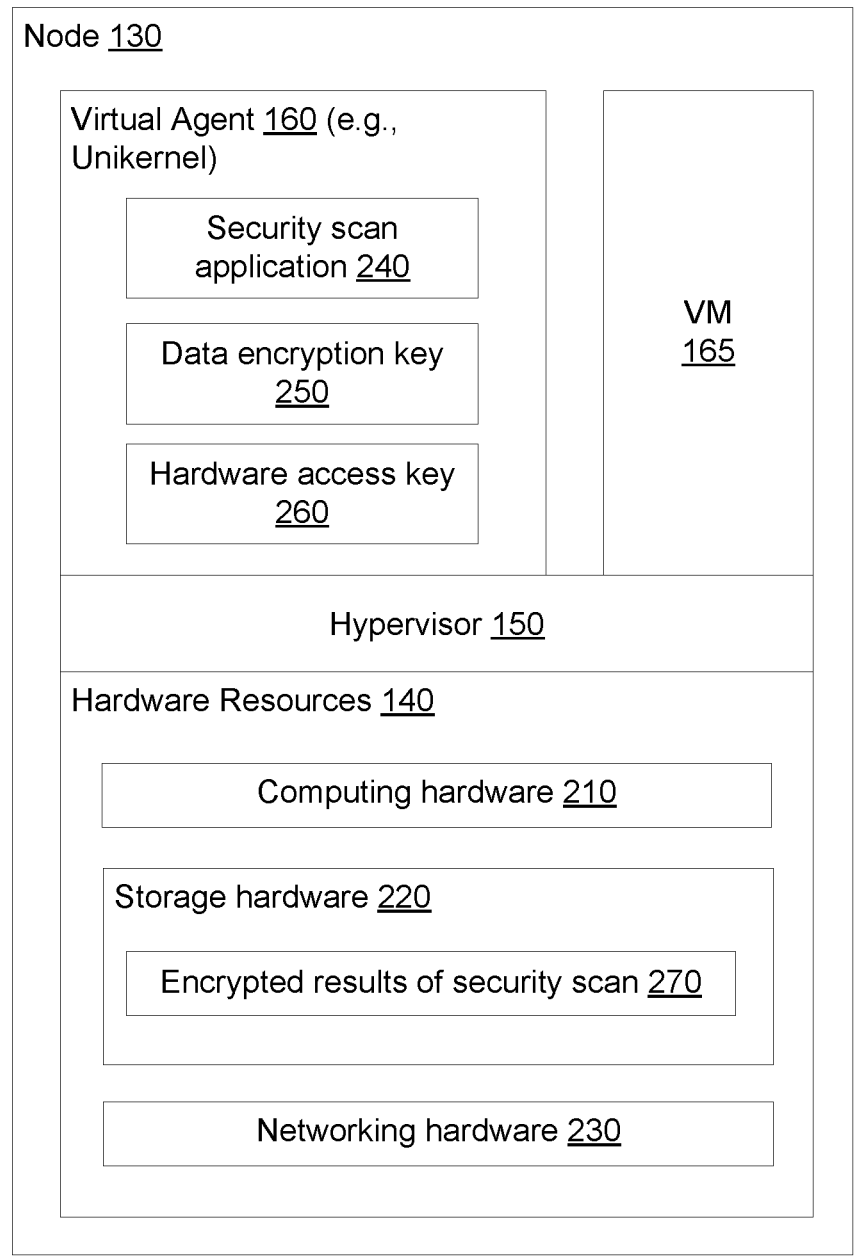
FIG. 2 is a block diagram illustrating a node that is executing a virtual agent, according to some embodiments.

FIG. 2 is a block diagram illustrating a node that is executing a virtual agent, according to some embodiments. The node 130 includes hardware resources 140 such as computing hardware 210, storage hardware 220, and networking hardware 230. The node 130 executes a hypervisor 150 or VMM that allows a virtual agent 160 and one or more VMs (e.g., VM 165 or other type of virtual appliance) executing on the node 130 to share the hardware resources 140 of the node 130. In one embodiment, the virtual agent 160 is implemented as a unikernel. The virtual agent 160 may include a security scan application 240 that performs a security scan of the node 130. The security scan application 240 may perform a security scan to detect the presence of unauthorized hardware, unauthorized software, unauthorized changes in configuration at the node 130, or any combination thereof. In one embodiment, the virtual agent 160 may include a hardware access key 260. The virtual agent 160 may use the hardware access key 260 to gain access to one or more hardware resources 140 of the node 130 (e.g., to perform a bus scan). The security scan application 240 may store the results of the security scan in storage hardware 220 allocated to the virtual agent 160 (e.g., the slice of storage hardware 220 that is allocated to the virtual agent 160). For example, the results of the security scan may be stored in RAM allocated to the virtual agent 160. The virtual agent 160 may also include a data encryption key 250. The virtual agent 160 may use the data encryption key 250 to encrypt the results of the security scan (e.g., encrypted results of security scan 270).

Figure 3:
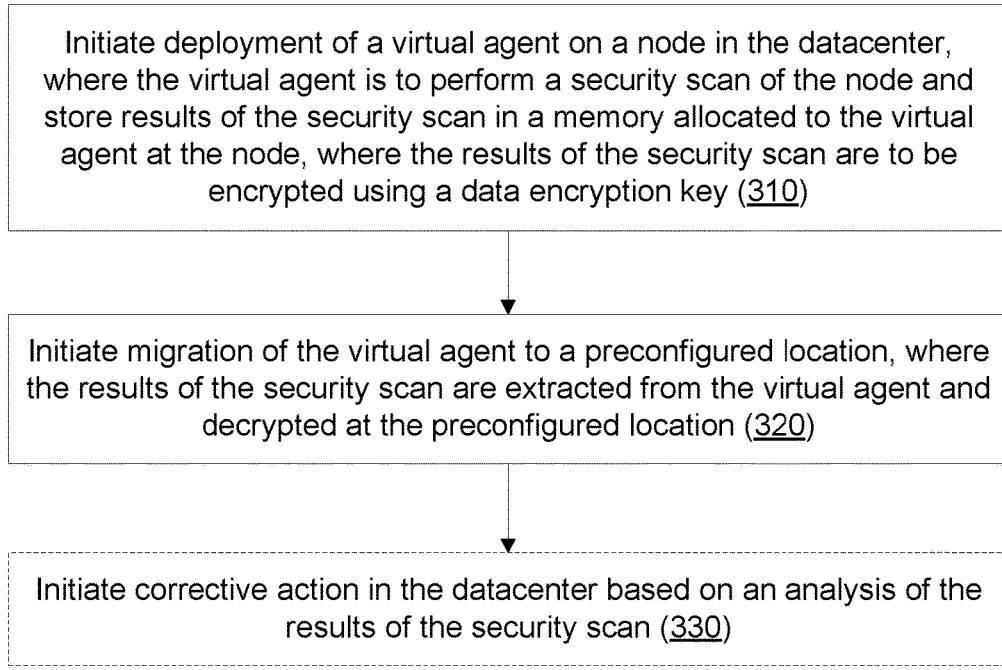
FIG. 3 is a flow diagram of a process for detecting unauthorized software and hardware in a datacenter using a virtual agent, according to some embodiments.

FIG. 3 is a flow diagram of a process for detecting unauthorized software and hardware in a datacenter using a virtual agent, according to some embodiments. In one embodiment, the process may be implemented by a network device 100 (e.g., cloud orchestration component 110 of network device 100) that is communicatively coupled to the datacenter 120. The operations in this flow diagrams will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram.

At block 310, the network device 100 initiates deployment of a virtual agent 160 on a node 130 in the datacenter 120. In one embodiment, the virtual agent 160 is implemented as a unikernel. In one embodiment, the network device 100 generates an obfuscated image 115 of the virtual agent 160 and deploys the virtual agent 160 on the node 130 using the obfuscated image 115 of the virtual agent 160. Once deployed, the virtual agent 160 performs a security scan of the node 130 and stores results of the security scan in memory allocated to the virtual agent 160 at the node 130 (e.g., a slice of RAM allocated to the virtual agent 160 at the node 130). In one embodiment the security scan scans for the presence of unauthorized software/firmware on the node 130. For example, the security scan may include a scan of a BIOS, a UEFI, an SCCM/SMS, a hypervisor executing on the node 130, or any combination thereof. In one embodiment, the security scan scans for the presence of unauthorized hardware on the node 130. For example, the security scan may include a scan of a hardware bus of the node 130. In one embodiment, the security scan scans for the presence of unauthorized configuration changes at the node 130. For example, as part of the security scan, the virtual agent 160 may detect that Wi-Fi is enabled on a motherboard of a node 130 located in a wire-only datacenter 120 and flag this configuration change as being suspicious. The security scan may include other types of scans, depending on the cloud operator's needs. In one embodiment, the virtual agent 160 includes a data encryption key 250. The virtual agent 160 may use the data encryption key 250 to encrypt the results of the security scan. In one embodiment, the virtual agent 160 includes a hardware access key 260 that provides the virtual agent 160 with permission to access one or more hardware resources 140 of the node 130. The virtual agent 160 may use the hardware access key 260, for example, to gain access to the hardware resources 140 that are needed to perform the security scan. In one embodiment, the virtual agent 160 includes an indication that the node 130 is the target execution environment, where the virtual agent 160 is configured to only execute on this particular node 130 that is designated as the target execution environment. In one embodiment, the virtual agent 160 hibernates in response to detecting that a computational load of the node 130 exceeds a predetermined threshold load.

At block 320, the network device 100 initiates migration of the virtual agent 160 to a preconfigured location. The results of the security scan can be extracted from the virtual agent 160 and decrypted at the preconfigured location. The preconfigured location is typically a location that is trusted (e.g., by the cloud operator) and known to be secure. The preconfigured location may have the necessary decryption key(s) to decrypt the encrypted security scan results extracted from the virtual agent 160. In one embodiment, the preconfigured location is the network device 100 where the cloud orchestration component 110 resides. In another embodiment, the preconfigured location is a node 130 in the datacenter 120.

At block 330, the network device 100 may initiate corrective action in the datacenter 120 based on an analysis of the results of the security scan. The corrective action may include migrating a tenant on the node 130 to another node 130 in the datacenter 120, installing a honeypot, decommissioning of the node 130, moving a tenant off the node 130, reinstalling an image on the node 130, deploying another virtual agent 160 in the datacenter 120, or other appropriate action (e.g., notifying the cloud operator of a potential security breach).

Figure 4:
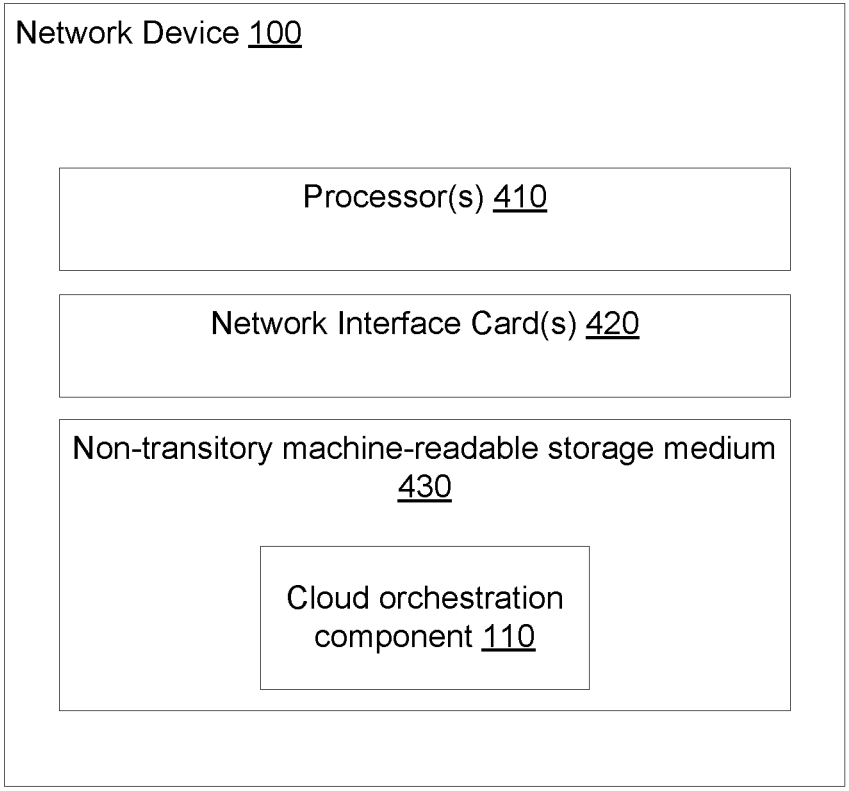
FIG. 4 is block diagram of a network device that can implement the detection of the presence of unauthorized software and hardware in a datacenter using a virtual agent, according to some embodiments.

FIG. 4 is block diagram of a network device that can implement the detection of the presence of unauthorized software and hardware in a datacenter using a virtual agent, according to some embodiments. The network device 100 includes a set of one or more processor(s) 410, which may be general purpose and/or a special purpose processor(s) (e.g., microprocessor). The network device 100 also includes a set of network interface card(s) (NICs) 420 to establish network connections (e.g., to transmit and/or receive code and/or data using propagating signals) with other computing devices such as nodes 130 in a datacenter 120 over a wired or wireless network. The network device 100 also includes a non-transitory machine readable storage medium 430 having stored therein a cloud orchestration component 110, which when executed by the processor(s) 410, causes the network device 100 to perform operations of one or more embodiments described herein above.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device communicatively coupled to a datacenter to detect a presence of unauthorized software and hardware in the datacenter, the method comprising:
    initiating deployment of a virtual agent on a node in the datacenter, wherein the virtual agent is to perform a security scan of the node and store results of the security scan in a memory allocated to the virtual agent at the node, and wherein the results of the security scan are to be encrypted by the virtual agent using a data encryption key; and
    initiating migration of the virtual agent to a preconfigured location that has been previously configured with a data decryption key for decrypting the results of the security scan prior to the migration of the virtual agent to the preconfigured location, wherein the results of the security scan are to be extracted from the virtual agent and decrypted at the preconfigured location using the data decryption key.

2. The method of claim 1, wherein the virtual agent is implemented as a unikernel.

3. The method of claim 1, further comprising:
    generating an obfuscated image of the virtual agent, wherein the virtual agent is deployed on the node using the obfuscated image of the virtual agent.

4. The method of claim 1, wherein the virtual agent includes a hardware access key that provides the virtual agent with permission to access one or more hardware resources of the node.

5. The method of claim 1, wherein the virtual agent includes an indication that the node is a target execution environment, and wherein the virtual agent is configured to only execute on the node.

6. The method of claim 1, wherein the security scan includes a scan of any one of a Basic Input/Output System (BIOS), a Unified Extensible Firmware Interface (UEFI), a System Center Configuration Manager or Systems Management Server (SCCM/SMS), and hypervisor installed on the node.

7. The method of claim 1, wherein the security scan includes a scan for unauthorized configuration changes at the node.

8. The method of claim 1, wherein the security scan includes a scan of a hardware bus of the node.

9. The method of claim 1, wherein the virtual agent is to hibernate in response to detecting that a computational load of the node exceeds a predetermined threshold load.

10. The method of claim 1, further comprising:
    initiating corrective action in the datacenter based on an analysis of the results of the security scan.

11. The method of claim 10, wherein the corrective action includes any one of migrating a tenant on the node to another node in the datacenter, installing a honeypot, decommissioning of the node, moving a tenant off the node, reinstalling an image on the node, and deploying another virtual agent in the datacenter.

12. A network device configured to detect a presence of unauthorized software and hardware in a datacenter, the network device comprising:
    a set of one or more processors; and
    a non-transitory machine-readable storage medium having stored therein a cloud orchestration component, which when executed by the set of one or more processors, causes the network device to initiate deployment of a virtual agent on a node in the datacenter, wherein the virtual agent is to perform a security scan of the node and store results of the security scan in a memory allocated to the virtual agent at the node, and wherein the results of the security scan are to be encrypted by the virtual agent using a data encryption key and initiate migration of the virtual agent to a preconfigured location that has been previously configured with a data decryption key for decrypting the results of the security scan prior to the migration of the virtual agent to the preconfigured location, wherein the results of the security scan are to be extracted from the virtual agent and decrypted at the preconfigured location using the data decryption key.

13. The network device of claim 12, wherein the virtual agent is implemented as a unikernel.

14. The network device of claim 12, wherein the cloud orchestration component, when executed by the set of one or more processors, further causes the network device to initiate corrective action in the datacenter based on an analysis of the results of the security scan.

15. The network device of claim 12, wherein the cloud orchestration component, when executed by the set of one or more processors, further causes the network device to generate an obfuscated image of the virtual agent, wherein the virtual agent is deployed on the node using the obfuscated image of the virtual agent.

16. The network device of claim 12, wherein the virtual agent includes a hardware access key that provides the virtual agent with permission to access one or more hardware resources of the node.

17. A non-transitory machine-readable medium having computer code stored therein, which when executed by a set of one or more processors of a network device communicatively coupled to a datacenter, causes the network device to perform operations for detecting a presence of unauthorized software and hardware in the datacenter, the operations comprising:
  initiating deployment of a virtual agent on a node in the datacenter, wherein the virtual agent is to perform a security scan of the node and store results of the security scan in a memory allocated to the virtual agent at the node, and wherein the results of the security scan are to be encrypted by the virtual agent using a data encryption key; and
  initiating migration of the virtual agent to a preconfigured location that has been previously configured with a data decryption key for decrypting the results of the security scan prior to the migration of the virtual agent to the preconfigured location, wherein the results of the security scan are to be extracted from the virtual agent and decrypted at the preconfigured location using the data decryption key.

18. The non-transitory machine-readable medium of claim 17, wherein the virtual agent is a unikernel.

19. The non-transitory machine-readable medium of claim 17, wherein the computer code, when executed by the set of one or more processors of the network device, causes the network device to perform further operations comprising:
  initiating corrective action in the datacenter based on an analysis of the results of the security scan.

20. The non-transitory machine-readable medium of claim 17, wherein the virtual agent includes a hardware access key that provides the virtual agent with permission to access one or more hardware resources of the node.

* * * * *